March 8, 1938.  L. G. BYRD  2,110,620
COUPLER
Filed May 8, 1937   2 Sheets-Sheet 1
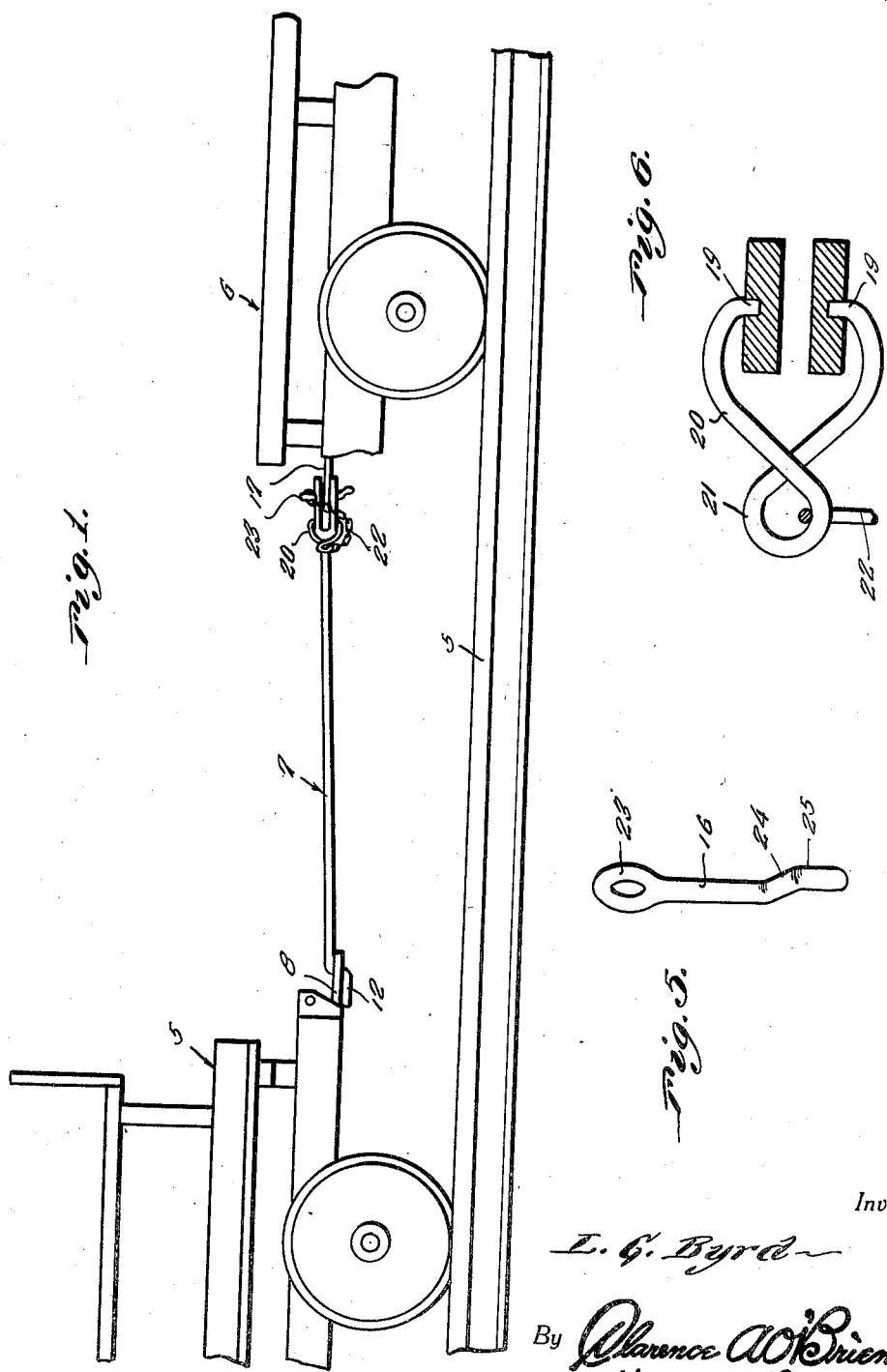
Inventor
L. G. Byrd
By Clarence A. O'Brien
Hyman Berman
Attorneys March 8, 1938.  L. G. BYRD  2,110,620
COUPLER
Filed May 8, 1937  2 Sheets-Sheet 2
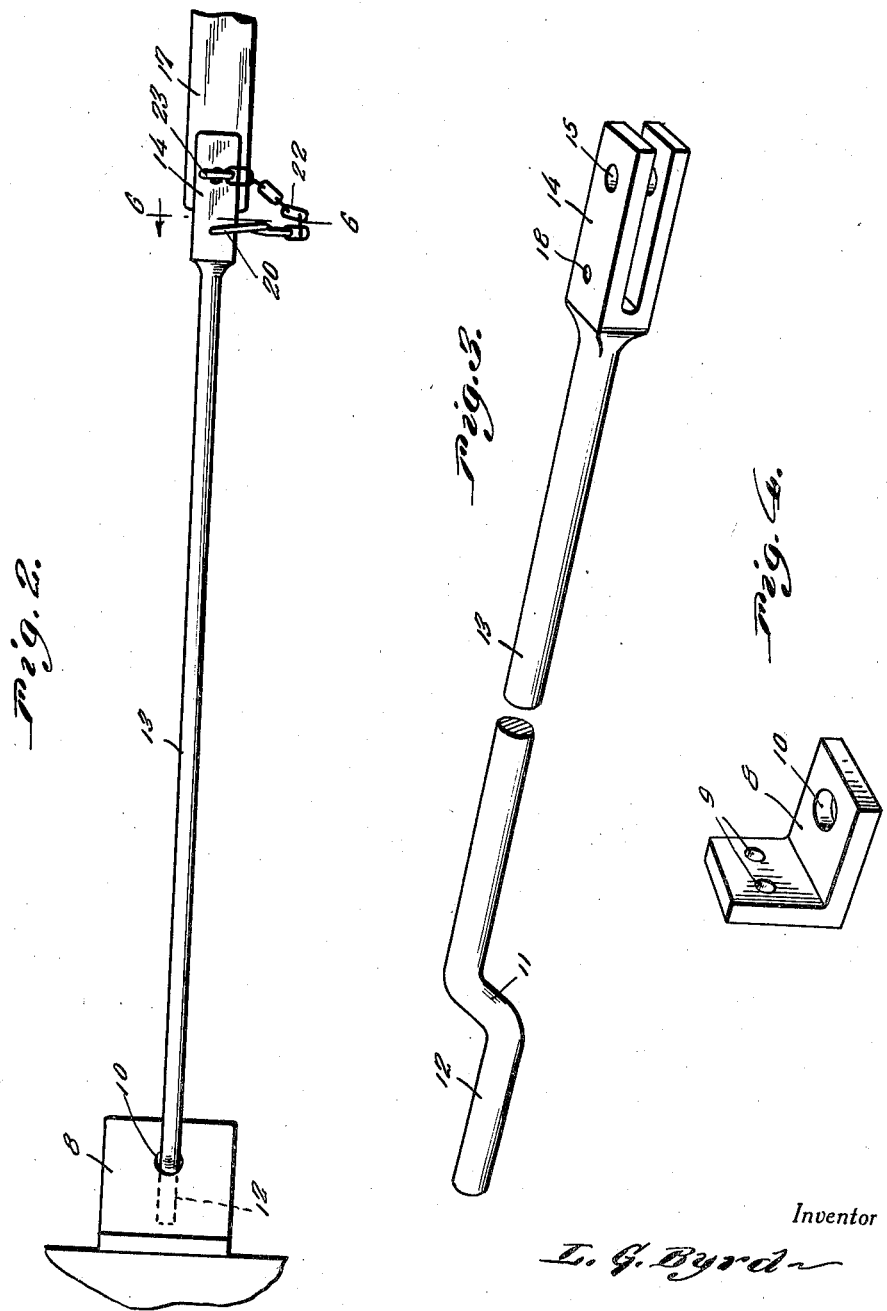

Patented Mar. 8, 1938

2,110,620

UNITED STATES PATENT OFFICE 2,110,620

COUPLER

Lonnie Guy Byrd, Poplar Bluff, Mo.

Application May 8, 1937, Serial No. 141,537

2 Claims. (Cl. 280—33.15)

This invention appertains to new and useful improvements in couplers for motor, push, and trailer cars.

The principal object of the present invention is to provide a coupler which because of its car connecting means promotes the factor of safety over present types of couplers now in general use.

Another important object of the present invention is to provide a coupler which is of simple construction and capable of easy repair or replacement.

These and various other important objects and advantages of the invention will become apparent to the reader of the following specification.

In the drawings:

Figure 1 represents a side elevational view of the coupling between a pair of cars.

Figure 2 is a fragmentary top plan view showing the coupler.

Figure 3 is a perspective view of the coupler bar.

Figure 4 is a perspective view of the angle iron member.

Figure 5 is a perspective view of the coupling pin.

Figure 6 is a sectional view taken substantially on line 6—6 of Figure 2.

Referring to the drawings, wherein like numerals designate like parts, it can be seen that numeral 5 represents a trackway upon which the push car 5 and trailer 6 are rideable. Numeral 7 generally refers to the coupling means between the cars.

The propelled car 5 has the angle iron member 8 secured to the rear end thereof by passing suitable securing means through the openings 9 thereof. The outstanding flange portion of this angle member 8 has an oversized opening 10 therein to accommodate the offset 11 of the extension 12 located at one end of the coupling bar 13, which coupling bar is provided with a fork 14 at its opposite end provided with openings 15 therethrough for receiving the coupling pin 16. This coupling pin also extends through an opening in the outwardly extending strap 17 on the trailer 6. The strap extends between the fingers of the fork 14. Furthermore, the fork 14 is provided with recesses 18 at its top and bottom sides for receiving the inturned pintle-like extensions 19 on the spring clip 20, which clip is formed at its intermediate portion to define a loop 21 through which one end of a chain section 22 is disposed, as shown in Figure 6. The chain 22 extends through the eye 23 on the upper end of the coupling pin 16. This coupling pin is provided at its lower portion with an offset 24 merging with a short extension 25.

Obviously, the coupling bar 13 is first connected with the angle member 8 by tapping the extension 12 down through the opening 10 in a substantial vertical position, and then as the offset 11 reaches the opening 10, dropping the bar 13 to a horizontal position and engaging the strap 17 between the fingers of the fork 14 where the fork and strap can be interlocked by the pin 16. The pin 16 is engaged through the opening in the strap 17 and the openings 15 by causing a backward and forward movement of the trailer 6 as the offset 24 reaches the openings in the strap 17 and the lower finger of the fork 14.

Obviously, with the coupling set up for use in this manner, it is practically impossible for the same to become disconnected from either one of the cars.

While the foregoing specification sets forth the invention in specific terms, it is to be understood that numerous changes in the shape, size, and materials may be resorted to without departing from the spirit and scope of the invention as claimed hereinafter.

Having thus described the invention, what I claim as new is:

1. Means for connecting a drawbar to a vehicle comprising a bracket connected to the vehicle and having a vertical aperture therein, said drawbar having a bifurcated end adapted to straddle the bracket and apertures in the bifurcated end adapted to register with the aperture in the bracket, and a rigid pin having a straight shank part for insertion through said apertures, an intermediate part adapted for location below said bifurcated end and oblique to the straight part, and a straight terminal part extending from the oblique part in axially offset relation to the straight shank part.

2. Means for connecting a coupling pin to a drawbar provided with a pair of apertures in opposite sides thereof, respectively, comprising a chain attached at one end to said pin, and a clevis comprising, a rod-like piece of resilient metal bent upon itself intermediate its ends to form an eye to which the other end of the chain is attached, and a pair of inwardly reacting crossed arms having inturned ends adapted under reaction of said arms to seat in said apertures, respectively, with a snap action.

LONNIE G. BYRD.